United States Patent
Ohmori

(10) Patent No.: US 8,509,544 B2
(45) Date of Patent: Aug. 13, 2013

(54) TEMPLATE MATCHING APPARATUS AND METHOD THEREOF

(75) Inventor: Yoshihiro Ohmori, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 306 days.

(21) Appl. No.: 12/736,129

(22) PCT Filed: Mar. 2, 2009

(86) PCT No.: PCT/JP2009/054701
§ 371 (c)(1),
(2), (4) Date: Sep. 13, 2010

(87) PCT Pub. No.: WO2009/113598
PCT Pub. Date: Sep. 17, 2009

(65) Prior Publication Data
US 2011/0002549 A1    Jan. 6, 2011

(30) Foreign Application Priority Data

Mar. 13, 2008 (JP) ................................. 2008-064537

(51) Int. Cl.
*G06K 9/64* (2006.01)
*G06K 9/68* (2006.01)

(52) U.S. Cl.
USPC ......................................... 382/217; 382/298

(58) Field of Classification Search
USPC ......................................... 382/217, 218, 298
See application file for complete search history.

(56) References Cited

U.S. PATENT DOCUMENTS

| 5,987,456 | A * | 11/1999 | Ravela et al. ............................. 1/1 |
| 6,944,331 | B2 * | 9/2005 | Schmidt et al. ............... 382/165 |
| 7,508,954 | B2 * | 3/2009 | Lev ................................. 382/100 |
| 7,526,412 | B2 * | 4/2009 | Mani et al. ..................... 702/194 |
| 8,194,134 | B2 * | 6/2012 | Furukawa ...................... 348/169 |
| 2005/0151724 | A1 * | 7/2005 | Lin et al. ....................... 345/166 |
| 2006/0041410 | A1 * | 2/2006 | Strebelle ......................... 703/10 |
| 2011/0002549 | A1 * | 1/2011 | Ohmori ......................... 382/218 |

FOREIGN PATENT DOCUMENTS

| JP | 62-196771 | 8/1987 |
| JP | 6-174444 | 6/1994 |
| JP | 2001-43374 | 2/2001 |
| JP | 2001-92486 | 4/2001 |
| JP | 2001-224014 | 8/2001 |
| JP | 3474131 | 9/2003 |

OTHER PUBLICATIONS

Murase, H. et al., "Fast Visual Search Using Focussed Color Matching—Active Search", IEICE Transactions on Information and Systems, (D-II), vol. J81-D-11, No. 9, (Sep. 1998), pp. 2035-2042.
International Search Report for PCT/JP2009/054701, mailed Apr. 28, 2009.
Murase, H. et al., "Fast Visual Search Using Focussed Color Matching—Active Search—", IEICE Transactions on Information and Systems, (D-II), vol. J81-D-11, No. 9, (Sep. 1998), pp. 2035-2042.
Vinod, V.V. et al., "Focused Color Intersection with Efficient Searching for Object Extraction", Pattern Recognition, vol. 30, No. 10, (1997), pp. 1787-1797.

* cited by examiner

*Primary Examiner* — Gregory M Desire
(74) *Attorney, Agent, or Firm* — Nixon & Vanderhye, P.C.

(57) ABSTRACT

A template matching apparatus includes a template input unit configured to input the template image; a signal input unit configured to input an image to be matched; a template scaling unit configured to scale the template image; a matching unit configured to match a scaled template image and an input image; a scaling factor determining unit configured to determine a scaling factor of the template image on the basis of a similarity obtained by matching; and a result output unit configured to output a result of matching when matching within a range of a predetermined scaling factor is completed.

10 Claims, 8 Drawing Sheets

TEMPLATE MATCHING APPARATUS AND METHOD THEREOF

This application is the U.S. national phase of International Application No. PCT/JP2009/054701, filed 2 Mar. 2009, which designated the U.S. and claims priority to JP Application No. 2008-064537, filed 13 Mar. 2008, the entire contents of each of which are hereby incorporated by reference.

TECHNICAL FIELD

The present invention relates to a template matching apparatus configured to match a template with an input signal fast while expanding or reducing the same and a method thereof.

BACKGROUND ART

In the template image matching method disclosed in Hiroshi MURASE, V. V. Vinod, "Fast visual search using focused color matching—active search" Publication of The Institute of Electronic, Information and Communication Engineers, vol. J81-D-II, No. 9, pp. 2035-2042, September 1998 (Non-Patent Document 1), the active search method is proposed which is able to search a template fast by omitting matching transactions within the regions having the similarity which does not reach a predetermined threshold value $\theta$. The regions are derived from an upper limit of the similarity of a periphery of the template image based on a feature such that, a similarity of a template image is not changed abruptly even though it is slightly moved.

Accordingly, the active search method achieves a fast detection of a position of the template image.

DISCLOSURE OF INVENTION

In case of the size of the matching region in the input image is not unknown, it is necessary for existing search methods to search the template image by changing the size of the template image little by little. Therefore the existing methods were not able to achieve fast search about size change.

Accordingly the present invention provides a template matching apparatus which achieves a fast matching even when the size of the template image is changed and a method thereof.

The present invention provides a template matching apparatus including: a signal input unit configured to input an input signal; a matching unit configured to (1) obtain similarities with a template having a predetermined initial size or templates obtained by scaling the templates having the initial size by a given scaling factor in sequence while moving a search position on the input signal, (2) obtain the similarities on the basis of a distribution of an amount of characteristics of the templates and a distribution of an amount of characteristics in a search window on the input signal at respective search positions, and (3) obtain a highest similarity from among the similarities; a limit value calculating unit configured to calculate an upper limit value of expansion or a lower limit value of reduction of the scaling factor of the template from the highest similarity so that the highest similarity obtained when the template is expanded or reduced does not exceed a threshold value; a scaling unit configured to expand or reduce the template on the basis of the scaling factor within the upper limit value of expansion or the lower limit value of reduction; a repeat control unit configured to expand and reduce the template by the scaling unit until the template having the size included in a given range is achieved and repeat searching on the basis of the expanded or reduced template by the matching unit.

The present invention also provides a template matching apparatus including: a signal input unit configured to input an input signal: a first matching unit configured to (1) obtain similarities with a template having a predetermined initial size or templates obtained by scaling the templates having the initial size by a scaling factor within a given scaling range in sequence while moving a search position on the input signal, (2) obtain the similarities on the basis of a distribution of an amount of characteristics of the templates and a distribution of an amount of characteristics in a search window on the input signal at respective search positions, and (3) obtain a highest similarity from among the similarities; an estimating unit configured to estimate an estimated highest similarity for the input signal when the template is expanded or reduced on the basis of the highest similarity; a first limit value calculating unit configured to calculate an upper limit value and a lower limit value of the scaling factor of the template from the estimated highest similarity so that a highest similarity when the template is expanded or reduced does not exceed a threshold value; a scaling unit configured to scale the template by the scaling factor within a scaling range determined by the upper limit value and the lower limit value; a second matching unit configured to (1) obtain the similarity of the scaled template while moving a search position on the input signal, (2) obtain similarities on the basis of a distribution of the amount of characteristic on the template and a distribution of the amount of characteristic in the search window on the input signal at the respective search positions, and (3) obtain a highest similarity among the similarities; a second limit value calculating unit configured to calculate a scaling range including an upper limit value of expansion or a lower limit value of reduction of the scaling factor of the template from the highest similarity so that the highest similarity when the template is expanded or reduced does not exceed the threshold value; a backtrack unit configured to change the scaling factor used in the matching unit when the scaling range obtained by the second limit value calculating unit and the scaling range whereby a size of the template used by the first matching unit for searching is determined are not overlapped; and a renewing unit configured to control the estimating unit to use the highest similarity from the second matching unit instead of the highest similarity from the first matching unit when the scaling range obtained by the second scaling ratio calculating unit and the scaling range whereby the size of the template used by the first matching unit for searching is determined are overlapped; and a repeat control unit configured to expand or reduce the template by the scaling unit until the size of the template reaches a given range and repeat the search by the template expanded or reduced by the first matching unit and the second matching unit.

According to the embodiments of the present invention, fast search is achieved by reducing the number of times of the scaling of the template without causing missing detections.

BEST MODE FOR CARRYING OUT THE INVENTION

Figure 1:
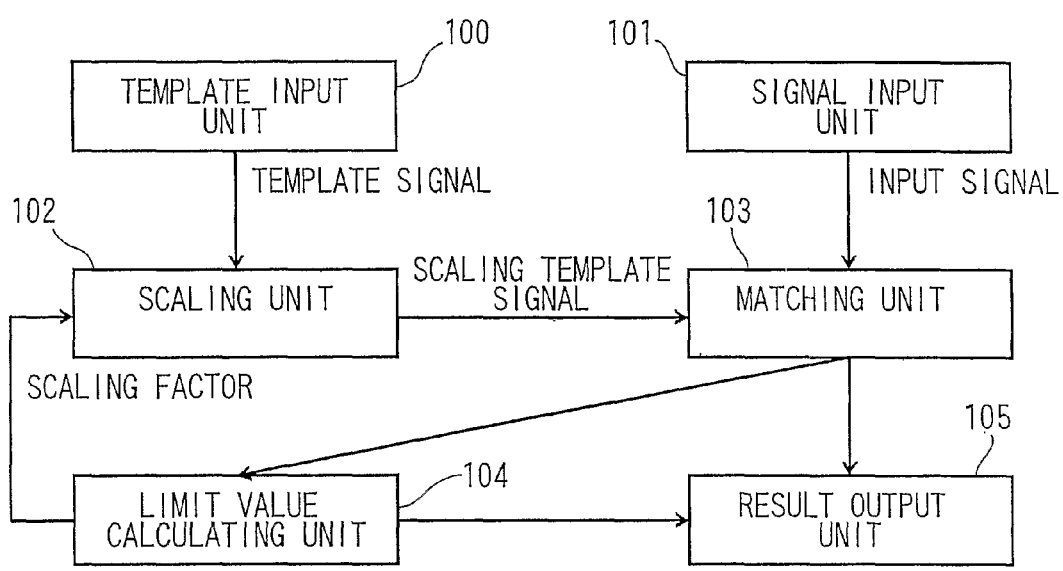
FIG. 1 is a block diagram showing a configuration of a template matching apparatus according to a first embodiment.

Referring now to the drawings, a template matching apparatus according to embodiments of the present invention will be described.

A template matching apparatus whose search space has two dimension will be described in a first embodiment, a template matching apparatus whose search space has one dimension will be described in a second embodiment, a template matching apparatus whose search space has n dimensions will be described in a third embodiment, a template matching apparatus whose search space has n dimensions and a scaling factor of a template is different from dimension to dimension will be described in a fourth embodiment, and a template matching apparatus which calculates similarities (inverse of distance) by a norm on the basis of an average brightness will be described in a fifth embodiment.

(1 First Embodiment)

Referring now to FIG. 1 to FIG. 6, the template matching apparatus according to the first embodiment of the invention will be described.

In this embodiment, an image matching whose search space has two dimensions will be described as an example. Matching is carried out while expanding or reducing at a scaling factor α of a template image. As a result of matching, a reduction ratio αmax of the template image having the highest similarity and the position thereof (xmax, ymax) will be outputted.

(1-1) Configuration of Template Matching Apparatus

FIG. 1 is a block diagram showing the template matching apparatus.

The template matching apparatus includes a template input unit 100 configured to input the template image, a signal input unit 101 configured to input an image to be matched, a scaling unit 102 configured to scale the template image, a matching unit 103 configured to match the scaled template image and an input image, a limit value calculating unit 104 configured to determine the scaling factor of the template image on the basis of the similarity obtained by a matching, and a result output unit 105 configured to output a result of matching when the matching is completed over an entire range of a predetermined scaling factor.

The template input unit 100 inputs a template image signal and stores the same in a memory.

The signal input unit 101 inputs the image to be matched with the template image and stores the same in the memory.

The scaling unit 102 scales the template image on the basis of the scaling factor which is determined by the limit value calculating unit 104, described later, and stores the same in the memory.

The matching unit 103 matches the template image scaled in the scaling unit and the input image input in the signal input unit and detects a position where the highest similarity is obtained.

The limit value calculating unit 104 calculates at least one of an upper limit or a lower limit which allows scaling of the template on the basis of the similarity detected by the matching unit 103. The limit value calculating unit 104 also serves as a repeat control unit which controls the scaling unit 102 and the matching unit 103 to repeat scaling and matching until the matching is completed over an entire range of a predetermined scaling factor.

The result output unit 105 outputs the scaling factor and the position in the input image at which the highest similarity is obtained.

The template matching apparatus can also be realized by using a multi-purpose computer apparatus as a basic hardware. In other words, the template input unit 100, the signal input unit 101, the scaling unit 102, the matching unit 103, the limit value calculating unit 104 and the result output unit 105 may be realized by causing a processor mounted on the computer apparatus to execute a program. At this time, the template matching apparatus may be realized by installing the program in the computer apparatus in advance, or may be realized by storing the same in a storage medium such as a CD-ROM or by distributing the program via a network and installing the program in the computer apparatus as needed. Also, B and C are realized by using storage medium such as a memory or a hard disk built in or externally connected to the computer apparatus, CD-R, CD-RW, DVD-RAM, or DVD-R as appropriate.

(1-2) Expansion

Figure 2:
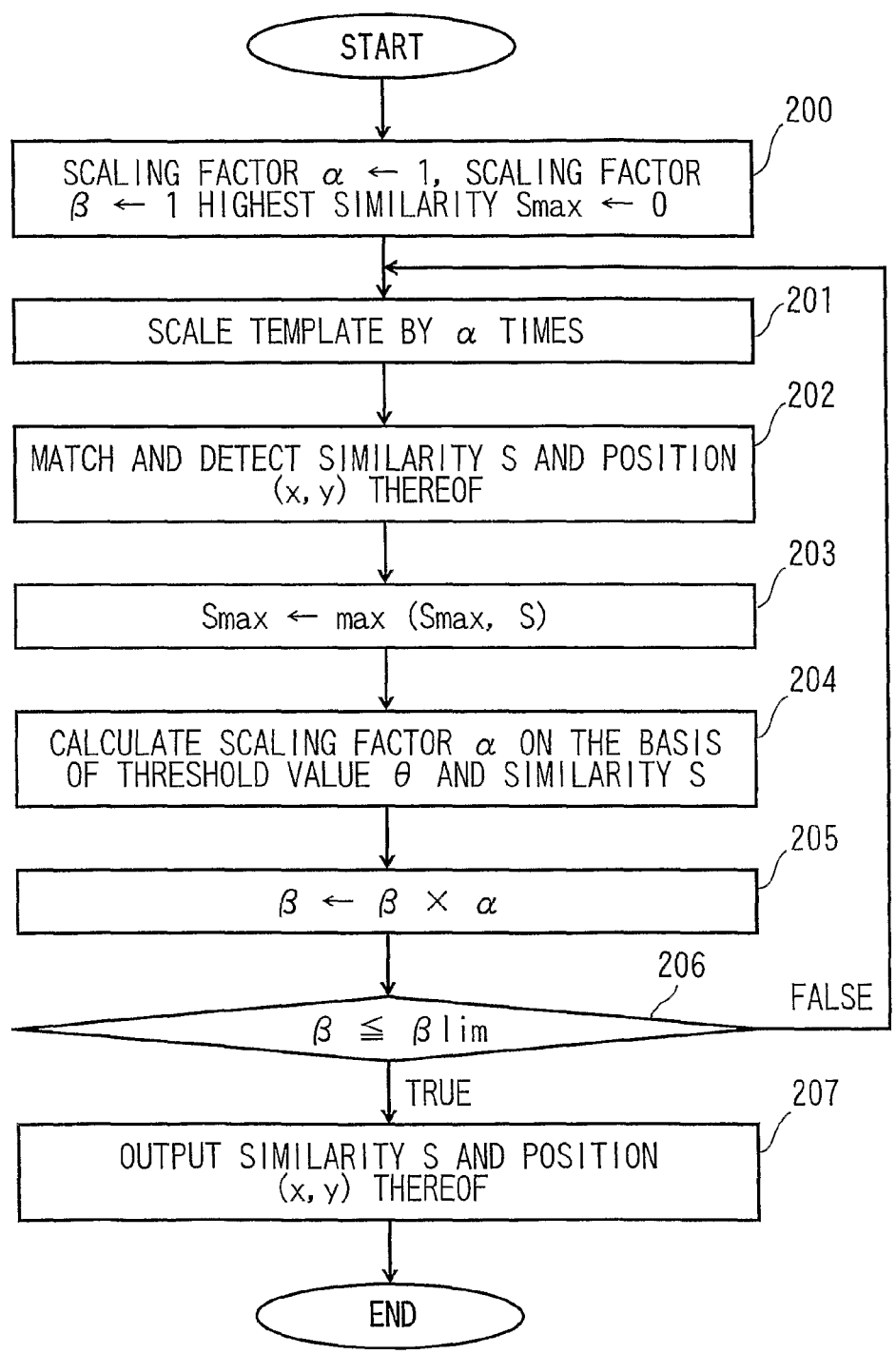
FIG. 2 is a flowchart showing an operation of the first embodiment.
Figure 3:
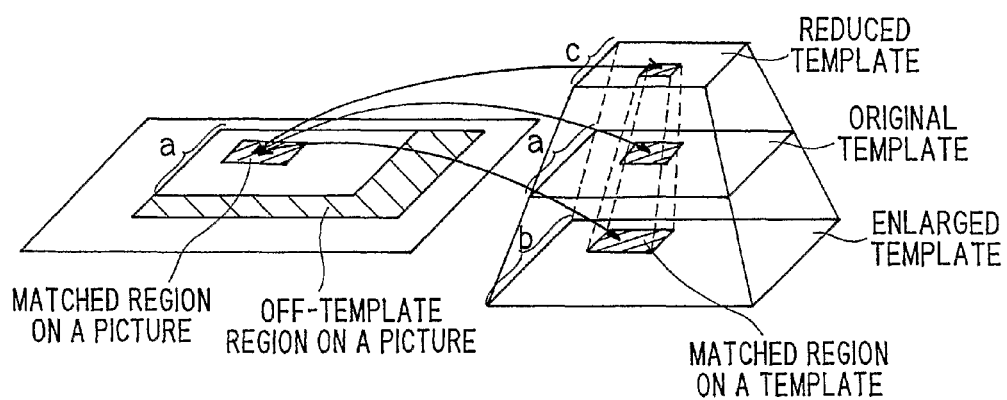
FIG. 3 is an explanatory drawing showing an outline of an image matching according to the first embodiment.

Referring now to FIG. 2 and FIG. 3, an operation of the template matching apparatus will be described. FIG. 2 is a flowchart showing the operation of the template matching apparatus. FIG. 3 is an explanatory drawing showing an outline of the image matching.

In this embodiment, the matching may be proceeded while expanding the template, or the matching may be proceeded while reducing the same. A case of matching while expanding the scaling factor of the template from one time to βlim times (where βlim>1) will be described below.

In Step 200, the scaling factor α of the limit value calculating unit 104 is initialized to 1.

A scaling width β which indicates a ratio between the size of the input template and the size of the current template is initialized to 1.

A highest similarity Smax of the result output unit 105 is initialized to 0.

A search position (x, y) is initialized to (−1, −1), which is out of range of the search space. The position of the image may be indicated by coordinates from an original point (0, 0) to maximum numbers of pixels in vertical and horizontal directions. When scanning the image, scanning proceeds from the position of the original point (0, 0) in the vertical and horizontal directions in sequence.

The template image is inputted by the template input unit 100 and is stored in the memory in advance.

The image to be matched is also inputted by the signal input unit 101 and stored in the memory in advance.

A threshold value θ is set. In this invention, positions whose similarities are lower than θ are not determined.

In Step 201, the scaling unit 102 stores the template image scaled at the scaling factor α in the memory.

In Step 202, the matching unit 103 matches the scaled template and the input image, and detects the search position (x, y) where the highest similarity is obtained and a similarity S thereof.

In this embodiment, normalized histogram intersection is employed as the similarity. The method of matching may be any method as long as it can detect the position on the input image where the highest similarity is obtained. For example, the method by Murase in Non-Patent Document 1, or a method of searching all the searching point may be employed for detection.

The normalized histogram intersection is obtained by an expression (1) where the signs hw and ht represent a search window on the input image and a m-dimensional vector which represents a histogram as the distribution of the template, respectively, and the signs hwi and hti represent the search window on the input image and an $i^{th}$ histogram element of the template, respectively.

$$s(h_w, h_t) = \sum_{i=1}^{m} \min(h_{wi}, h_{ti}) \quad (1)$$

In Step 203, the result output unit 105 inputs the scaling factor α, a position (x, y) where the highest similarity is obtained, and the similarity S thereof. When the relation Smax>S is established, it is renewed to Smax=S.

In Step 204, the limit value calculating unit 104 calculates an upper limit value αupper of the scaling factor on the basis of maximum value S of the similarity detected by matching and the threshold value θ. A method of calculating the value αupper will be described later. The scaling factor α is set to a range which does not exceed the upper limit value αupper. When the value αupper falls short of a predetermined minimum value αmin of the scaling factor, α is set as α=αmin.

In Step 205, the limit value calculating unit 104 renews the scaling width with β=β×α.

In Step 206, the limit value calculating unit 104 controls such that the procedure goes back to Step 201 and the processes from Step 201 to Step 205 are repeated if the scaling width is β≧βlim.

In Step 207, the result output unit 105 outputs the highest similarity Smax and the search position (x, y) thereof and end the process.

(1-3) Method of Calculating Upper Limit of Scaling Factor in Expansion

Figure 4:
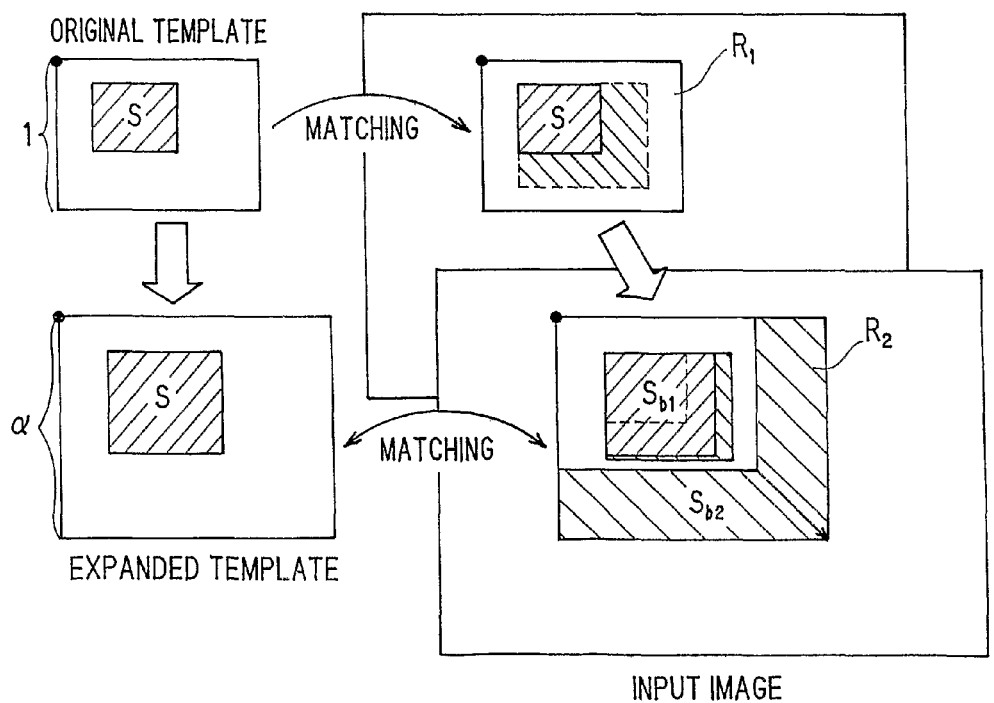
FIG. 4 is a drawing for explaining a method of calculating an upper limit of a scaling factor when expanding a template according to the first embodiment.
Figure 6:
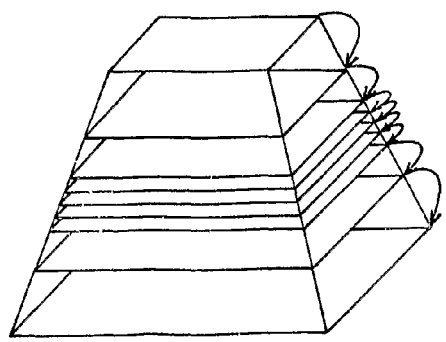
FIG. 6 is a drawing for explaining a state of matching while changing a scaling width according to the first embodiment.

Referring now to FIG. 4 and FIG. 6, a method of calculating the upper limit of the scaling factor in expansion of the template will be described.

FIG. 4 is a drawing for explaining a method of calculating the upper limit of the scaling factor when expanding the template. An upper side of FIG. 4 shows a state of matching a template image having an original size and an input image, and a lower side of FIG. 4 shows a state of matching an expanded template image and the input image. FIG. 6 is a drawing for explaining the state of matching while changing the scaling width β.

The sign S represents the similarity in the template of the original size, where 0≦S≦1 is satisfied.

A sign Sb1 represents a highest similarity in a range of an original template after the expansion, where 0≦Sb1≦1 is satisfied.

A sign Sb2 is the highest similarity in an off-template region on the template after the expansion, where 0≦Sb2≦1 is satisfied.

A sign α represents the scaling factor (an expansion ratio) of one side of the template, where 1<α is satisfied.

A sign R1 represents the search window as a matched region on the original template.

A sign R2 represents the search window on the expanded template.

In this manner, when matching is performed with the template magnified by α, the number of matched pixels on the expanded template is increased to $\alpha^2$ times as shown by a hatched region on the lower left portion of FIG. 4.

When calculating the similarities on the basis of the normalized histogram intersection, when it is assumed that there are sufficient number of pixels which have a potential to match on the input image, the upper limit of the similarity after the expansion in a search window R1 with the original template is Sb1=S as shown by a hatched region shown in the lower right in FIG. 4.

In contrast, when it is assumed that an entire part of an off-R1 region in a search window R2 on the expanded template contributes increase in similarity, the highest similarity in the off-R1 region is Sb2=1−1/$\alpha^2$. Therefore, the upper limit of similarities after the expansion is expressed by a following expression (2).

$$Sb = Sb1 + Sb2 = S + 1 - 1/\alpha^2 \quad (2)$$

When solving the expression to obtain $\alpha^2$ on the basis of Sb<θ, $$-1/\alpha^2 < \theta - 1 - S$$

is obtained. The sign θ is a threshold value given in advance, and 0≦θ≦1. Since θ−1−S<0 is always satisfied, $$\alpha^2 < 1/(1+S-\theta)$$

is obtained. The expansion is considered in this case, $\alpha^2 > 1$, that is, S<θ should be satisfied.

Therefore, the range of $\alpha^2$ which satisfies Sb<θ may be expressed by a following expression (3).

$$1 < \alpha^2 < 1/(1+S-\theta), \text{ where } S > \theta \quad (3)$$

(1-4) Reduction

In the description given above, the case where the template is expanded has been described. However, fast matching is also achieved by reducing the template. In this case, only Step 204 and Step 206 are different. A case of matching while reducing the template from one time to αlower times will be described only about the difference as Step 204' and Step 206'.

In Step 204', the limit value calculating unit 104 calculates a lower limit value αlower of the scaling factor on the basis of the maximum value S of the similarity detected by matching. A method of calculating αlower will be described later. The scaling factor α is set to a range which does not fall short of the lower limit value αlower. When the value αupper is smaller than the predetermined minimum value αmin of the scaling factor, α is set as α=αmin.

In Step 206', if the scaling width is β≧βlim, the procedure goes back to Step 201, and the processes from Step 201 to Step 205 are repeated. Otherwise, the procedure goes to Step 207.

(1-5) Method of Calculating Lower Limit of Scaling Factor in Reduction

Figure 5:
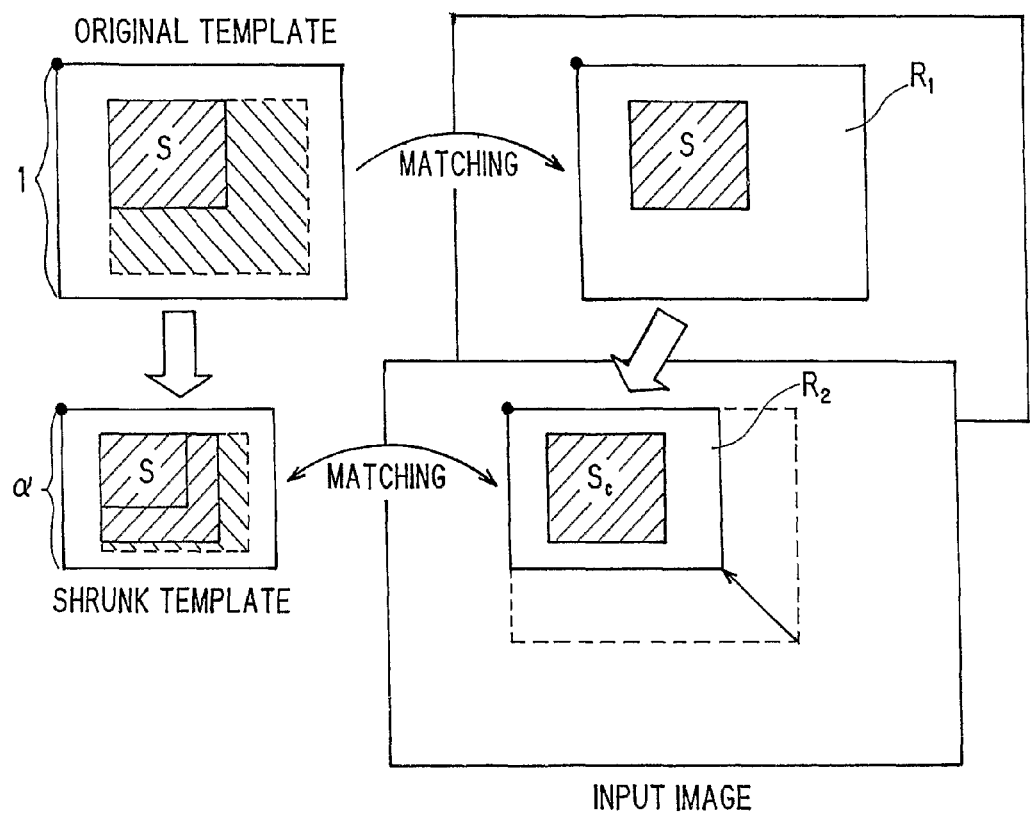
FIG. 5 is a drawing for explaining a method of calculating a lower limit of the scaling factor when reducing the template according to the first embodiment.

Referring now to FIG. 5, a method of calculating a lower limit of the scaling factor in reduction of the template will be described.

FIG. 5 is a drawing for explaining a method of calculating the lower limit of the scaling factor when reducing the template. An upper side of FIG. 5 shows a state of matching the template image having the original size and an input image, and a lower side of FIG. 5 shows a state of matching a reduced template image and the input image.

The sign S represents the similarity in the template of the original size, where $0 \leq S \leq 1$ is satisfied.

A sign Sc represents a highest similarity in a range of the original template after the reduction, where $0 \leq Sb1 \leq 1$ is satisfied.

The sign α represents the scaling factor of one side of the template, where $0 < \alpha < 1$ is satisfied.

The sign R1 represents the search window on the original template.

The sign R2 represents the search window on the reduced template.

As shown by the hatched region in FIG. 5 on the lower right portion, the number of matched pixels on the input image does not change.

As shown by the hatched region in FIG. 5 on the lower left portion, when it is assumed that there are sufficient number of pixels which have a potential to match on the template when calculating the similarities on the basis of the normalized histogram intersection, the upper limit of the similarity in the search window R2 on the input image after the reduction of the template is $Sc = S/\alpha^2$ (where $\alpha < 1$).

In reduction, the off-template portion as in expansion does not occur. Therefore, the upper limit of the similarity after the reduction is expressed by a following expression (4).

$$Sc = S/\alpha^2 \quad (4)$$

When the range of $\alpha^2$ which satisfies $Sc < \theta$ is obtained, the following expression (5) is obtained.

$$S/\theta < \alpha^2 < 1 \quad (5)$$

(1-6) Scaling Factor

When the expression (3) and the expression (5) are combined, and the case of α=1 is included, the upper limit and the lower limit of the $\alpha^2$ are expressed by a flowing expression (6).

$$S/\theta < \alpha^2 < 1/(1+S-\theta) \quad (6)$$

(1-7) Advantages

In this manner, according to the first embodiment, fast matching is achieved by omitting the matching with the templates whose similarities fall short of the threshold value θ given in advance.

(1-8 First Modification)

In the first modification, a case where the number of matched pixels is limited when the similarities are calculated on the basis of the normalized histogram intersection will be described. In other words, in the first embodiment, it is assumed that there are sufficiently large number of pixels which have a potential to match in the search window with the expanded template. However, if there is a limit, a degree of increase in similarities by the expansion of the template is smaller than the case of the first embodiment, and hence the similarities do not exceed the threshold value θ unless the template is further expanded. By utilizing this feature, the upper limit and the lower limit of the scaling factor α can further be increased.

(1-8-1) Method of Calculating Upper Limit of Scaling Factor

First of all, a method of calculating the upper limit of the scaling factor α in a case where the number of pixels which have a potential to match an expanded template in the search window is limited when calculating the similarities on the basis of the normalized histogram intersection will be described.

The similarity Sb1 after the expansion is not set to a possible maximum value, but is calculated actually. In this modification, since the similarities are calculated on the basis of the normalized histogram intersection, when the upper limit is calculated at every bin of the histogram, an uppermost similarity $Sb(\alpha^2)$ after the expansion can be expressed by a following expression (7) by using the expression (1).

$$Sb(\alpha^2) = S(hw, \alpha^2 ht) + 1 - 1/\alpha^2 \quad (7)$$

Obtaining the range of the $\alpha^2$ which satisfies $Sb(\alpha^2) < \theta$ is considered. Since the first term $S(hw, \alpha^2 ht)$ and the third term $-1/\alpha^2$ on the right side of the expression (7) are increased monotonously with $\alpha^2$, $Sb(\alpha^2)$ is also increased monotonously with $\alpha^2$. Therefore, the upper limit of $\alpha^2$ is obtained as a solution of $Sb(\alpha^2) = \theta$. For example, it is obtained by hill climbing algorithm for inspecting whether an equation is satisfied or not while increasing the value of $\alpha^2$ finely until the equation is satisfied. When a precise solution cannot be obtained, an approximate solution which satisfies $Sb(\alpha^2) < \theta$ in the vicinity of the precise solution may be obtained.

Therefore, the range of $\alpha^2$ which satisfies $Sb(\alpha^2) < \theta$ can be expressed by a following expression (8), where $f^{-1}(\theta)$ represents the value of α which satisfies a function $f(\alpha) = \theta$.

$$1 < \alpha^2 < f_5^{-1}(\theta) \text{ where } f_5(\alpha) = s(h_w, \alpha^2 h_t) + 1 - \frac{1}{\alpha^2} \quad (8)$$

(1-8-2) Method of Calculating Lower Limit of Scaling Factor

In a case where the number of pixels which have a potential to match the expanded template in the search window is limited when calculating the similarities on the basis of the normalized histogram intersection in reduction, the lower limit of the scaling factor α can further be reduced. A method of calculating the lower limit thereof will be described below.

The similarity Sc after the reduction is not set to the highest possible value, but is calculated actually. In this modification, since the similarities are calculated on the basis of the normalized histogram intersection, when the lower limit is calculated at every bin of the histogram, a similarity Sc ($\alpha^2$) after the reduction can be expressed by a following expression (9).

$$Sc(\alpha^2) = S(\alpha^2 h_w, h_t) \quad (9)$$

Obtaining the range of the $\alpha^2$ which satisfies $Sc(\alpha^2) < \theta$ is considered. Since the right side of an expression (9) is decreased monotonously with $\alpha^2$, $Sc(\alpha^2)$ is increased monotonously with $\alpha^2$. Therefore, the lower limit value of $\alpha^2$ is obtained as a solution of the $Sc(\alpha^2) = \theta$.

Therefore, the range of $\alpha^2$ which satisfies $Sc(\alpha^2) < \theta$ can be expressed by a following expression (10).

$$f_6^{-1}(\theta) < \alpha^2 < 1 \text{ where } f_6(\alpha) = s(\alpha^2 h_w, h_t) \quad (10)$$

(1-8-3) Combination

When the expression (8) and the expression (10) are combined, the upper limit and the lower limit of the scaling factor $\alpha^2$ can be expressed by a following expression (11).

$$f_7^{-1}(\theta) < \alpha^2 < f_8^{-1}(\theta) \tag{11}$$

where $f_7(\alpha) = s(\alpha^2 h_w, h_t)$ $f_8(\alpha) = s(h_w, \alpha^2 h_t) + 1 - \frac{1}{\alpha^2}$

(1-8-4) Advantages

In this modification, a throughput of calculation of the upper limit and the lower limit of the scaling factor $\alpha$ is increased. However, in the normal image matching, it is very small when compared with an amount of reduction of the throughput by being able to expand the upper limit and the lower limit of the scaling factor $\alpha$. Therefore, fast matching is achieved by this modification.

(1-9 Second Modification)

In the second modification, a case of using both the upper limit and the lower limit will be described. In other words, although only one of the lower limit and the upper limit of the scaling factor is used for reducing the template image in the first embodiment, the present invention is not limited thereto, and both the upper limit and the lower limit of the scaling factor may be used.

In this case, the position of the search window in Japanese Patent No. 3474131 is replaced by the scaling factor $\alpha$, and the similarity is replaced by the similarity S detected in Step 202. A case of matching while expanding the template will be described below.

First of all, the template matching is performed to obtain the highest similarity S. It is assumed that a highest similarity S' is not changed abruptly at the scaling factor in the periphery of the scaling factor $\alpha$, it is estimated to be S'=S. When obtaining the lower limit of the scaling factor using the expression (6), $\sqrt{(S/\theta)}$ is acquired. A value $\alpha'$ is estimated so that the lower limit of the scaling factor calculated when the template is multiplied by $\alpha'$ includes $\alpha$, and hence the scaling width is continued. Although there are many values of $\alpha'$ as such, the value of $\alpha'=\sqrt{(S/\theta)}-\gamma$ which is a value returned from the position most apart from $\alpha$ by $\gamma$ is determined by the limit value calculating unit 104. However, the value of $\gamma$ is a fixed value. The term "continue" here means a state in which the range of scaling determined by the upper limit and the lower limit of the scaling factor of the previous time and the range of scaling determined by the upper limit and the lower limit of the scaling factor of this time are overlapped with each other. If they are not overlapped with each other, a clearance (the scaling factor which is not searched) is generated between the range of scaling of the previous time and the range of scaling of this time, so that discontinuity is resulted.

Actually, the template is expanded by $\alpha'$ times to calculate an actual similarity S", thereby calculating an upper limit value $\alpha$upper' and a lower limit value $\alpha$lower' of the actual scaling factor. Since the lower limit value is $\alpha$lower'=$\sqrt{(S''/\theta)}$, when $\sqrt{(S/\theta)} \leq \sqrt{(S''/\theta)}-\gamma$ is satisfied, it is determined that the scaling factor is continued, and if not, it is determined to be discontinued.

When estimation is failed and $\alpha$ is not included in the range of the scaling factor, that is, when the range from the upper limit value $\alpha$upper' to the lower limit value $\alpha$lower' of the scaling factor and the range from the upper limit value $\alpha$upper to the lower limit value $\alpha$lower of the scaling factor of the previous time are not overlapped with each other and are discontinued, a backtrack process for bringing the scaling factor $\alpha'$ closer to $\alpha$ and trying matching again is performed. The method of bringing the scaling factor $\alpha'$ closer to $\alpha$ may be any method, such as increasing and decreasing the scaling factor $\alpha'$ by a fixed width or at a fixed scale factor toward the scaling factor $\alpha$, or employing an average of $\alpha'$ and $\alpha$ as a new $\alpha'$.

When the estimation is successful, the new highest similarity is designated as $\alpha$max, and the above-described processes are repeated until the entire scaling range is searched.

According to the modifications, the width of change of the scaling factor may be set to a large width in comparison with the first embodiment, and hence fast matching is achieved. The fast matching is also achieved in the case where matching is performed while reducing the template as in the case described above.

(1-10 Third Modification)

In the third modification, a detailed example of the method of expanding and reducing the template will be described on the basis of FIG. 7 and FIG. 8. In other words, the method of scaling of the template in the first embodiment is preferably a method in which the distribution of the histogram characteristic does not change abruptly before the scaling and after the scaling.

A case of reducing a template image of 4×4 to 2×2 will be described as an example. Respective elements of the template before a reduction are expressed by P1(x, y), and elements after the reduction are expressed by P2(x, y). A sign x represents a row, and a sign y represents a column.

(1-10-1) Problems

Figure 7:
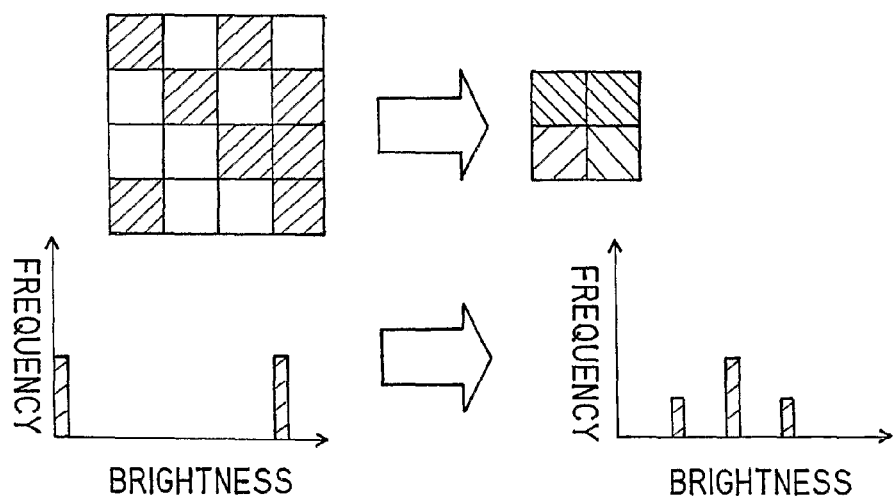
FIG. 7 is a drawing for explaining a case where a distribution of histogram characteristics is changed abruptly according to a third modification in the first embodiment.

FIG. 7 shows a case of reducing a template image from sixteen regions into four regions and averaging brightness values of the respective regions. The maximum value of the brightness value is set to 8, and it is assumed that there are only two brightness values; 0 and 8 before the reduction. Drawings on the lower side in FIG. 7 show a frequency of appearance with respect to the brightness value. Before the reduction, the pixels having the brightness value of 0 are present by the same number as the number of pixels having the brightness value of 8.

When the image is reduced by averaging;

$P2(1,1)=(8+0+8+0)/4=4$, $P2(1,2)=4$, $P2(2,1)=(0+0+8+0)/4=2$, $P2(2,2)=(8+8+0+8)/4=6$ are obtained.

Therefore, as shown in the distribution maps on the lower side of FIG. 7, the distribution of frequency of the brightness value is significantly changed, and a brightness value different from that before the reduction appears. In the first embodiment, since the similarities are calculated on the basis of the normalized histogram intersection, there is a problem such that the similarity becomes useless when the distribution of histogram characteristics of the brightness value is significantly changed.

(1-10-2) Solving Method

Figure 8:
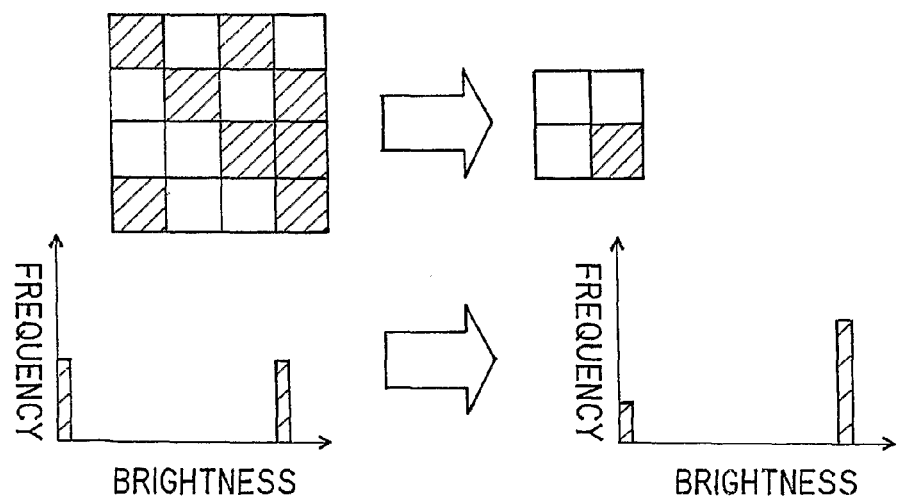
FIG. 8 is a drawing for explaining a case where the distribution of the histogram characteristics is not changed abruptly according to the third modification in the first embodiment.

FIG. 8 shows a case of reducing a template image from sixteen regions into four regions and selecting representative pixels at random from the respective regions. In this case, the brightness value which is different from the value before the reduction does not appear and the distribution of the histogram characteristics of the brightness value does not change significantly, so that the normalized histogram intersection can be calculated.

(1-11 Fourth Modification)

In the fourth modification, a case of dividing the input image will be described. In other words, in the first embodiment, the template matching is performed over the entire input image in Step 202. In Step 202, in order to calculate the maximum value S of the similarity of the input image, the scaling factor of the template cannot be changed significantly if the similarity is high only at one point even when the similarity of most part of the input image is zero.

Therefore, the input image may be divided into a plurality of regions to perform the template matching in the respective regions independently. For example, the input image is divided into four regions, and the template matching is performed on each of these regions by regarding each of these regions as an independent image.

Accordingly, the fast searching is achieved even on the input image having only a small part which is similar to the template by searching only the region having a portion similar to the template in detail and increasing the change of the scaling factor for other regions.

It is also possible to regard the respective pixels of the input image as divided regions. When matching while expanding the template, first of all, the upper limit values of scaling factor are stored for the respective pixels in the input image. When the minimum value of the upper limit value is changed as the scaling factor of the next template, the calculation of the similarity is omitted if it is within the range of the upper limit values stored in the respective pixels.

(2 Second Embodiment)

Referring now to FIG. 9 to FIG. 13, a template matching apparatus according to the second embodiment of the invention will be described.

In this embodiment, a case of a one-dimensional search space will be described. In other words, an image matching whose search space has two dimensions has been described in the first embodiment, the template matching apparatus is applied to a one-dimensional search space in this embodiment. More specifically, a speech matching will be described as an example. The term scaling in the speech matching means to scale a speech signal in a direction of time.

A configuration and a procedure of a speech template matching apparatus according to this embodiment are the same as the image template matching apparatus according to the first embodiment, and only the method of calculating the scaling factor in the limit value calculating unit 104 is different. The method will be described below.

(2-1) Expansion

First of all, a case of matching while expanding the template from one time to $\alpha upper$ times (where $\alpha upper >1$) will be described.

Figure 9:
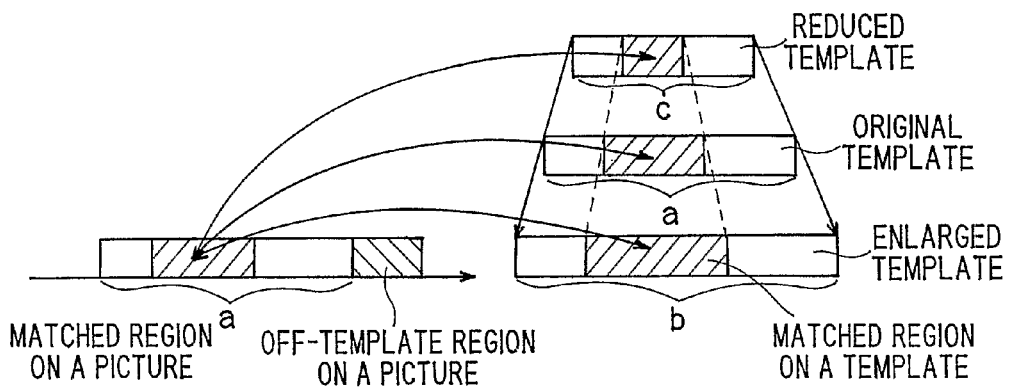
FIG. 9 is an explanatory drawing showing an outline of a voice matching according to a second embodiment.

FIG. 9 is an explanatory drawing showing an outline of the speech matching. In the same manner as the case of image matching, a matching with an input speech on the left side in FIG. 9 is performed while scaling templates on the right side in FIG. 9.

Figure 10:
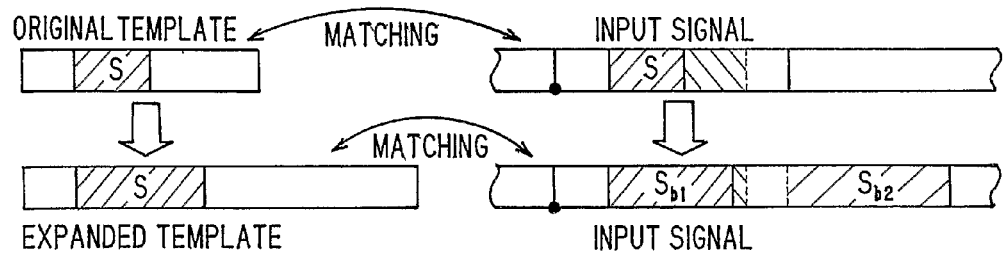
FIG. 10 is a drawing for explaining a method of calculating the upper limit of the scaling factor when expanding the template according to the second embodiment.

FIG. 10 is a drawing for explaining a method of calculating the upper limit of the scaling factor when expanding the template.

An upper portion in FIG. 10 shows a state of matching a template speech having an original size and an input speech and a lower side of FIG. 10 shows a state of matching an expanded template speech and the input speech.

The sign S represents the similarity in the template of the original size, where $0 \leq S \leq 1$ is satisfied.

The sign Sb1 represents an upper limit value of the similarity in a range of the original template after the expansion, where $0 \leq Sb1 \leq 1$ is satisfied.

A sign Sb2 is the upper limit value of the similarity in an off-template region on a template after the expansion, where $0 \leq Sb2 \leq 1$ is satisfied.

The sign $\alpha$ represents the scaling factor of one side of the template, where $1 < \alpha$ is satisfied.

Then, the number of matched pixels on the expanded template is increased to a times as shown by a hatched region on the lower left portion in FIG. 10. As shown by a hatched region on the lower right portion in FIG. 10, when it is assumed that there are sufficient number of pixels which have a potential to match on the input image when calculating the similarities on the basis of the normalized histogram intersection, the upper limit of the similarity in the original template after expansion is Sb1=S.

In contrast, an entire off-R1 region of the expanded template is able to contribute to increase in similarity. Therefore, the highest similarity in the off R−1 region is $Sb2=1-1/\alpha$. Therefore, the upper limit of similarities after the expansion is expressed by a following expression (12).

$$Sb=Sb1+Sb2=1+S-1/\alpha \quad (12)$$

When the region of a which satisfies Sb<θ, it is expressed by a following expression (13).

$$1<\alpha<1/(1+S-\theta), \text{ where } S>\theta \text{ is satisfied} \quad (13)$$

(2-2) Reduction

Subsequently, a case of matching while reducing the template from one time to $\alpha lower$ times (where $\alpha lower<1$) will be described.

Figure 11:
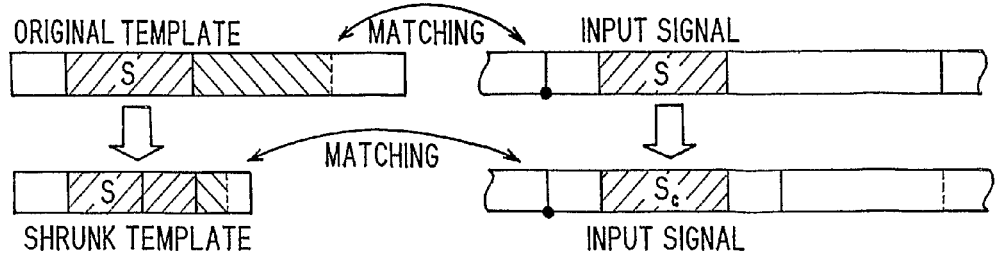
FIG. 11 is a drawing for explaining a method of calculating the lower limit of the scaling factor when reducing the template according to the second embodiment.
Figure 12:
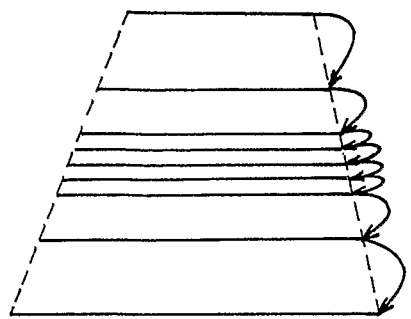
FIG. 12 is a drawing for explaining a state of matching while changing the scaling width according to the second embodiment.

As shown by a hatched region in FIG. 11 on the lower right portion, the number of matched samples on the input speech does not change. As shown by a hatched region in FIG. 11 on the lower left portion, when it is assumed that there are sufficient number of samples which have a potential to match on the template when calculating the similarity on the basis of the normalized histogram intersection, the upper limit of the similarity in the input speech after the reduction of the template is $Sc=S/\alpha$ (where $\alpha<1$).

In reduction, the off-template portion as in expansion does not occur. Therefore, the upper limit of similarities after the reduction is expressed by a following expression (14).

$$Sc=S/\alpha \quad (14)$$

When the range of $\alpha$ which satisfies Sc<θ is obtained, a following expression (15) is obtained.

$$S/\theta<\alpha<1 \quad (15)$$

(2-3) Combination

When the expression (13) and the expression (15) are combined, the upper limit and the lower limit of the scaling factor $\alpha$ can be expressed by a following expression (16).

$$S/\theta<\alpha<1/(1+S-\theta) \quad (16)$$

(2-4) Advantages

In this manner, according to this embodiment, when matching the voice signals, the upper limit and the lower limit of a scaling factor are obtained by the expression (16) in which the $\alpha^2$ of the image matching is replaced by $\alpha$.

Figure 13:
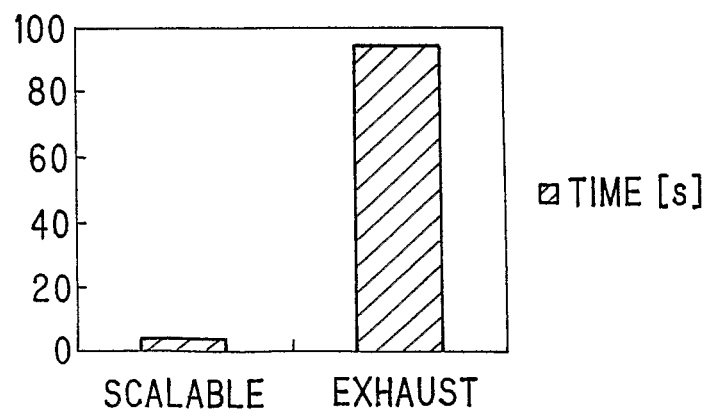
FIG. 13 shows a result of experiment in which processing speeds in the voice matching according to the second embodiment and the method in the related art are compared.

FIG. 13 shows a result of comparison of a process time in the voice matching according to the second embodiment and the process time of the method in the related art. As shown in FIG. 13, 20 times faster process is achieved.

(2-5) Modification

When the number of pixels which have a potential to match the expanded template in the search window is limited as in the first modification of the first embodiment, it can be expressed by a following expression (17) in which $\alpha^2$ in the expression (15) is replaced by $\alpha$.

$$f_9^{-1}(\theta) < \alpha < f_{10}^{-1}(\theta)$$

where $$f_9(\alpha) = s(\alpha h_w, h_t) \ f_{10}(\alpha) = s(h_w, \alpha h_t) + 1 - 1/\alpha \ldots \quad (17)$$

(3 Third Embodiment)

A template matching apparatus according to the third embodiment of the present invention will be described.

In this embodiment, a case of an n-dimensional search space will be described. In other words, the case where the image matching whose search space has two dimensions has been described as an example in the first embodiment, and the speech matching whose search space has one dimension has been described as an example in the second embodiment. In this embodiment, a case of being expanded to a signal matching in the n-dimensional search space will be described.

When calculating the similarity on the basis of the normalized histogram intersection in scaling, if there are sufficiently large number of signals which have a potential to match, the upper limit and the lower limit of the scaling factor $\alpha^n$ can be expressed by a following expression (18).

$$S/\theta < \alpha^n < 1/(1+S-\theta) \quad (18)$$

In the same manner as the first modification of the first embodiment when calculating the similarity on the basis of the normalized histogram intersection, if the number of pixels which have a potential to match the expanded template in the search window is limited, when considering that the signals which match in scaling is limited, the upper limit and the lower limit of scaling factor $\alpha^n$ can be expressed by a following expression (19).

$$f_{11}^{-1}(\theta) < \alpha^n < f_{12}^{-1}(\theta)$$

where $$f_{11}(\alpha) = s(\alpha^n h_w, h_t) \ f_{12}(\alpha) = s(h_w, \alpha^n h_t) + 1 - 1/\alpha^n \ldots \quad (19)$$

(4 Fourth Embodiment)

Figure 14:
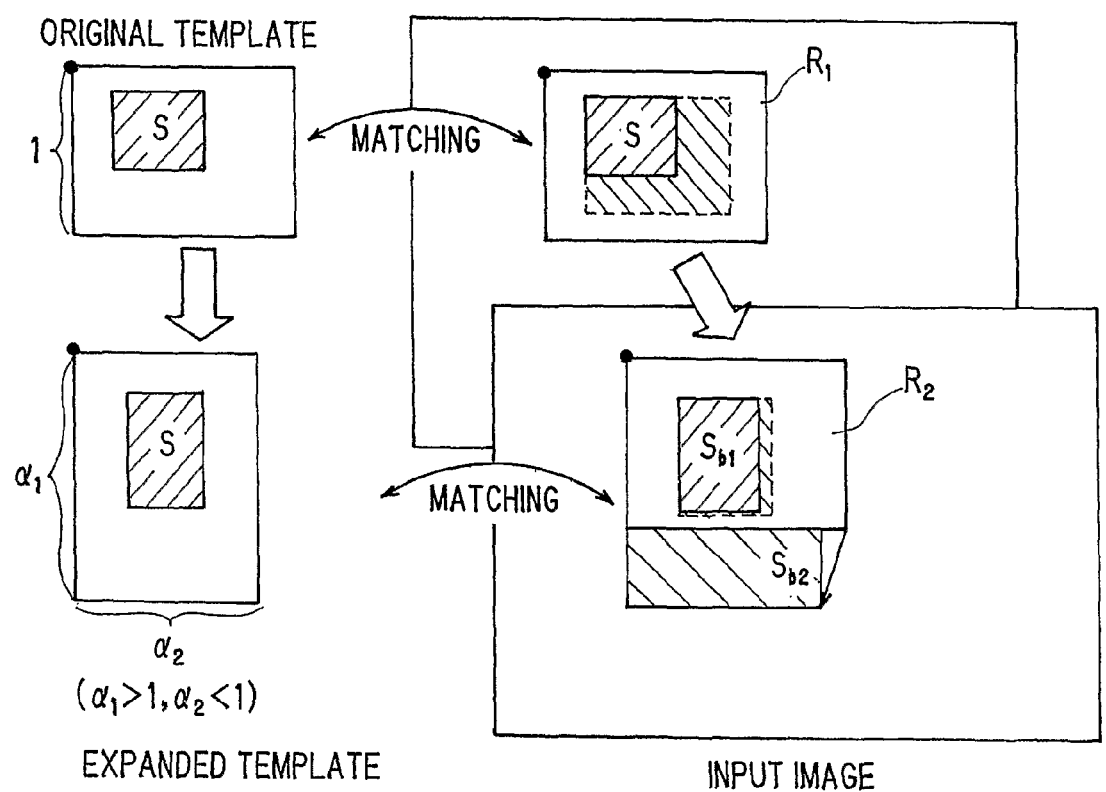
FIG. 14 is a drawing for explaining a method of calculating the upper limit of the scaling factor when scaling the template according to a fourth embodiment.

Referring now to FIG. 14, a template matching apparatus according to the fourth embodiment of the present invention will be described.

In this embodiment, a case where the scaling factors are independent in the respective dimensions will be described. In other words, in the respective embodiments in which the search space has two or more dimensions described thus far, the scaling factors in the respective dimensions are equal. However, in this embodiment, a case where the scaling factors in the respective dimensions are different will be described.

(4-1) Case of Two Dimensions

Referring now to FIG. 14, a method of calculating the upper limit of the scaling factor when scaling the template in a case of image matching which is a two-dimensional search space will be described. FIG. 14 is almost the same as FIG. 4, but is different in that the scaling factors of the template are $\alpha_1$ in the vertical direction and $\alpha_2$ in the horizontal direction, which are not equal.

As shown by a hatched region on the lower left portion in FIG. 14, the number of matched pixels on the expanded template is increased to $\alpha_1 \times \alpha_2$ times. As shown by a hatched area on the lower right portion in FIG. 14, when it is assumed that there are sufficient number of pixels which have a potential for matching on the input image when calculating the similarities on the basis of the normalized histogram intersection, the upper limit of the similarity in the original template in the search window R1 after expansion is Sb1=S.

In contrast, an entire off-R1 region in the search window R2 of the expanded template is able to contribute to increase in similarity. Therefore, in the case of $\alpha_1 > 1$, $\alpha_2 < 1$ as shown in FIG. 14, the highest similarity of the off-R1 region is $$Sb2 = 1 - 1/\alpha_1 \times 1.$$

When it is expressed generally considering that the off-R1 region is eliminated when the side is reduced, it can be expressed by:

$$Sb2 = 1 - \min(1, 1/\alpha_1) \times \min(1, 1/\alpha_2).$$

Therefore, the upper limit of similarities after the expansion is expressed by a following expression (20);

$$Sb = Sb1 + Sb2 = S + 1 - \min(1, 1/\alpha_1) \times (1, 1/\alpha_2) \quad (20)$$

where the function min (*) is a function which outputs a minimum value of two variables.

(4-2) Case of n Dimensions

Subsequently, a case of n dimensions, which is more general, will be described.

When there are sufficient signals which match the input signal as shown in FIG. 1, $$Sb1 = S,$$

$$Sb2 = 1 - \min(1, 1/\alpha_1) \times \min(1, 1/\alpha_2) \times \ldots \times \min(1, 1/\alpha_n)$$
are satisfied.

In this case, the upper limit in scaling factor is provided.

As shown in FIG. 5, when there are sufficient signals which match the template when calculating the similarities on the basis of the normalized histogram intersection, $$Sb1 = S/(\min(1, 1/\alpha_1) \times \min(1, 1/\alpha_2) \times \ldots \times \min(1, 1/\alpha_n)),$$

$$Sb2 = 1 - \min(1, 1/\alpha_1) \times \min(1, 1/\alpha_2) \times \ldots \times \min(1, 1/\alpha_n)$$
are satisfied.

In this case, the lower limit in scaling factor is provided.

Therefore, the upper limit and the lower limit of an n-dimensional scaling factor vector $\alpha$ can be expressed by a following expression (21).

$$f_{13}^{-1}(\theta) < \alpha < f_{14}^{-1}(\theta) \quad (21)$$

$$\text{where } f_{13}(\alpha) = \frac{s}{\prod_{i=1}^{n} \frac{1}{\alpha_i}} + 1 - \prod_{i=1}^{n} \min\left(1, \frac{1}{\alpha_i}\right)$$

$$f_{14}(\alpha) = s + 1 - \prod_{i=1}^{n} \min\left(1, \frac{1}{\alpha_i}\right)$$

$\alpha_1$ is an element of vector $\alpha$ (4-3) Modification

When the number of pixels which has a potential to match the expanded template in the search window is limited when calculating the similarities on the basis of the normalized histogram intersection as in the first modification of the first embodiment, the upper limit and the lower limit of the scaling factor vector $\alpha$ can be expressed by a following expression (22).

$$f_{15}^{-1}(\theta) < \alpha < f_{16}^{-1}(\theta) \tag{22}$$

$$\text{where } f_{15}(\alpha) = \frac{s(\alpha \cdot I \cdot h_w, h_t)}{\prod_{i=1}^{n} \frac{1}{\alpha_i}} + 1 - \prod_{i=1}^{n} \min\left(1, \frac{1}{\alpha_i}\right)$$

$$f_{16}(\alpha) = s(h_w, \alpha \cdot I \cdot h_t) + 1 - \prod_{i=1}^{n} \min\left(1, \frac{1}{\alpha_i}\right)$$

where $\alpha_i$ is an element of vector $\alpha$ and I represents a unit vector (5 Fifth Embodiment)

In a fifth embodiment, a case of using a distance to be calculated by a norm of the brightness average value as a similarity used in the first embodiment will be described. In other words, in the embodiments described thus far, the normalized histogram intersection between the histogram of the amount of characteristics of the template image and the histogram of the amount of characteristic of the input image is calculated in Step 203. However, the method of calculating the similarity may be of any method as long as the upper limit of the similarity is obtained by the scaling of the template image.

Here, as an example, a case where an $L_1$ norm of an average brightness, that is, an absolute value of a difference is used will be described. However, when using distances instead of the similarities, the meaning of the magnitude of a numerical value is inverted, and hence it is necessary to pay attention when obtaining the upper limit of the similarity.

(5-1) Method of Calculating Upper Limit of Scaling Factor in Expansion

A case of expanding the template image will be descried first. Where $c_1$ and $c_2$ are average brightness values of the template image and the input image respectively and $\theta$ is a threshold value, the distance is obtained by $D=|c_i-c_2|$, and $|*|$ outputs the absolute value. A case of $c_2-c_1>\theta$ and a case of $c_1-c_2>\theta$ are described separately.

(5-1-1) When $c_2-c_1>\theta$ in Expansion

A case where the average brightness $c_1$ of the input image is larger than the average brightness $c_2$ of the template image, and reducing an average brightness $c_2'$ after expansion in the search window set on the input image are considered. Assuming that the entire part of a run-off region after expansion contributes to a reduction of average brightness $c_2'$, $c_2'=c_2/\alpha^2$ is satisfied. Therefore, the distance after the expansion, $Db=c_2'-c_1$ will be $Db=c_2/\alpha^2-c_1$. When $\alpha^2$ is solved on the basis of $Db>\theta$;

$$\alpha_2 < c_2/(c_1+\theta) \tag{23}$$

is satisfied.

(5-1-2) When $c_1-c_2>\theta$ in Expansion

A case where the average brightness $c_1$ of the input image is smaller than the average brightness $c_2$ of the template image, and increasing the average brightness $c_2'$ after expansion in the search window set on the input image are considered. Assuming that the entire part of the run-off region after expansion contributes to an increase of average brightness $c_2'$, $c_2'=(c_2+\alpha^2-1)/\alpha^2$ is satisfied. Therefore, the distance after the expansion, $Db=c_1-c_2'$ will be $Db=c_1-(c_2+\alpha^2-1)/\alpha^2$. When $\alpha^2$ is solved on the basis of $Db>\theta$;

$$\alpha^2 < (1-c_2)/(1-c_1+\theta) \tag{24}$$

is satisfied.

(5-2) Method of Calculating Upper Limit of Scaling Factor in Reduction

The case of $c_2-c_1>\theta$ and the case of $c_1-c_2>\theta$ will be described separately in reduction as well.

(5-2-1) When $c_2-c_1>\theta$ in Reduction

A case where the average brightness $c_1$ of the input image is larger than the average brightness $c_2$ of the template image and reducing the average brightness $c_2'$ after reduction in the search window set on the input image are considered. Assuming that the entire part of an off-search window region after reduction contributes to a decrease of average brightness $c_2'$, $c_2°=(c_1+\alpha^2-1)/\alpha^2$ is satisfied. Therefore, the distance after the reduction, $Dc=c_2'-c_1$ will be $Dc=(c_1+\alpha^2-1)/\alpha^2-c_1$. When $\alpha^2$ is solved on the basis of $Dc>\theta$, $$\alpha^2 > (1-c_2)/(1-c_1-\theta) \tag{25}$$

is satisfied.

(5-2-2) When $c_1-c_2>\theta$ in Reduction

A case where the average brightness $c_1$ of the input image is smaller than the average brightness $c_2$ of the template image, and increasing the average brightness $c_2'$ after reduction in the search window set on the input image are considered. Assuming that the entire part of the off-search window region after reduction contributes to an increase of average brightness $c_2'$, $c_2'=c_2/\alpha^2$ is satisfied. Therefore, the distance after the reduction, $De=c_1-c_2'$ will be $c_1-c_2/\alpha^2$. When $\alpha^2$ is solved on the basis of $Dc>\theta$;

$$\alpha^2 > c_2/(c_1-\theta) \tag{26}$$

is satisfied.

(5-3) Combination

When the expression (23) and the expression (24) are combined, if $c_2-c_1>\theta$, $$(1-c_2)/(1-C_1-\theta) < \alpha^2 < c_2/(c_1+\theta) \tag{27}$$

is satisfied.

When the expression (24) and the expression (26) are combined, if $c_1-c_2>\theta$, $$c_2/(C_1-\theta) < \alpha^2 < (1-c_2)/(1-c_1+\theta) \tag{28}$$

is satisfied.

(5-4) Modification

Although the $L_1$ norm is used as the method of calculating the distance in the fifth embodiment, $L_2$ norm which is the sum of squared of the difference, or $L_n$ norm which is the sum of $n^{th}$ power of the difference may be used.

Although the image matching whose search space has two dimensions has been described as an example in the fifth embodiment, the speech matching whose search space has one dimension, or the search space having n dimensions may also be applicable. In such a case, $\alpha^2$ in the expression (27) and the expression (28) is replaced by a in the case of one dimension, and $\alpha^n$ in the case of the n dimensions.

Alternatively, any method of calculating the distance may be employed as long as the lower limit of the distance is obtained and the norm does not necessarily have to be used. In the case of the similarities, any method may be employed as long as the upper limit of the similarity is obtained.

(6 Modifications)

The present invention is not limited to the respective embodiments exactly as described above, but the components may be modified without departing the scope of the invention in the stage of embodiments.

Also, various modes of the invention are achieved by combining a plurality of components disclosed in the embodi-

The invention claimed is:

1. A template matching apparatus comprising:
a signal input unit configured to input an input signal;
a matching unit configured to (1) obtain similarities between the input signal and a template at different search positions on the input signal, the template being an initial template having a predetermined initial size or a scaled template obtained by expanding or reducing the initial template by a given scaling factor, (2) obtain the similarities on the basis of a distribution of amount of characteristics of the template and a distribution of amount of characteristics in a search window on the input signal at respective search positions, and (3) obtain a highest similarity from among the similarities;
a limit value calculating unit configured to calculate an upper limit value of expansion or a lower limit value of reduction of the scaling factor of the template from the highest similarity so that the highest similarity obtained when the template is expanded or reduced does not exceed a threshold value;
a scaling unit configured to expand or reduce the template on the basis of the scaling factor within the upper limit value of expansion or the lower limit value of reduction; and
a repeat control unit configured to expand and reduce the template, by the scaling unit, until a template having a size included in a given range is achieved and repeat searching on the basis of the expanded or reduced template by the matching unit.

2. A template matching apparatus comprising:
a signal input unit configured to input an input signal;
a first matching unit configured to (1) obtain first similarities between the input signal and a template at different search positions on the input signal, the template being an initial template having a predetermined initial size or a scaled template obtained by expanding or reducing the initial template by a given scaling factor, (2) obtain the first similarities on the basis of a distribution of amount of characteristics of the template and a distribution of amount of characteristics in a search window on the input signal at respective search positions, and (3) obtain a highest first similarity from among the first similarities;
an estimating unit configured to estimate an estimated highest similarity for the input signal when the template is expanded or reduced on the basis of the highest first similarity;
a first limit value calculating unit configured to calculate an upper limit value and a lower limit value of the scaling factor of the template from the estimated highest similarity so that a highest similarity when the template is expanded or reduced does not exceed a threshold value;
a scaling unit configured to scale the template by the scaling factor within the scaling range determined by the upper limit value and the lower limit value;
a second matching unit configured to (1) obtain second similarities between the input signal and the scaled template while moving a search position on the input signal, (2) obtain the second similarities on the basis of a distribution of amount of characteristics on the scaled template and a distribution of amount of characteristics in a search window on the input signal at respective search positions and (3) obtain a highest second similarity among the second similarities;
a second limit value calculating unit configured to calculate a scaling range including an upper limit value of expansion or a lower limit value of reduction of the scaling factor of the template from the highest second similarity so that a highest similarity when the template is expanded or reduced does not exceed the threshold value;
a backtrack unit configured to change the scaling factor used in the scaling unit when the scaling range obtained by the second limit value calculating unit and the scaling range whereby a size of the template used by the first matching unit for searching is determined are not overlapped;
a renewing unit configured to control the estimating unit to use the highest second similarity instead of the highest first similarity when the scaling range obtained by the second limit value calculating unit and the scaling range whereby the size of the template used by the first matching unit for searching is determined are overlapped; and
a repeat control unit configured to expand or reduce the template, by the scaling unit, until the size of the template reaches a given range and repeat the search by the template expanded or reduced, by the first matching unit and the second matching unit.

3. The template matching apparatus according to claim 2, wherein when the first limit value calculating unit or the second limit value calculating unit expands or reduces the template having n dimensions at the scaling factor $\alpha$ (where, $\alpha > 0$) which is a scaling factor in which the lengths of all dimensions of the n-dimensional template are the same scale, the first limit value calculating unit or the second limit value calculating unit calculates the upper limit value and the lower limit value of the scaling factor $\alpha$ by:

$$S/\theta < \alpha^n < 1/(1+S-\theta) \qquad (A)$$

where S ($0 \leq S \leq 1$) is a highest similarity of a previous time calculated by the first matching unit or the second matching unit, and $\theta$ ($0 \leq \theta \leq 1$) is the threshold value.

4. The template matching apparatus according to claim 2, wherein the first matching unit or the second matching unit calculates the similarities on the basis of a normalized histogram intersection.

5. The template matching apparatus according to claim 4, wherein when expanding or reducing the template having n dimensions are scaled at the scaling factor $\alpha$ ($\alpha > 0$) which is the scaling factor in which the lengths of all dimensions of the n-dimensional template are the same scale, the first matching unit or the second matching unit calculates a highest similarity of this time by a function $S(*)$ shown by an expression (B), where S ($0 \leq S \leq 1$) is a highest similarity calculated by a search of the previous time by the first matching unit or the second matching unit, $\theta$ ($0 \leq \theta \leq 1$) is the threshold value, hw and ht are m-dimensional vectors which represent a histogram as the distribution of the amount of characteristics in the search window on the input signal and the distribution of the amount of characteristics of the template respectively, and $hw_i$, $ht_i$ are $i^{th}$ histogram elements of the amount of characteristics in the search window on the input signal and the amount of characteristics of the template respectively, wherein the the first limit value calculating unit or the second limit value calculating unit calculates the upper limit value and the lower limit value of the scaling factor α by a following expression (C);

$$s(h_w, h_t) = \sum_{i=1}^{n} \min(h_{wi}, h_{ti}) \quad (B)$$

$$f_1^{-1}(\theta) < \alpha^n < f_2^{-1}(\theta)$$

$$f_1(\alpha) = s(\alpha^n, h_w, h_t)$$

$$f_2(\alpha) = s(h_w, \alpha^n h_t) + 1 - \frac{1}{\alpha^n} \quad (C)$$

where $f(\theta)^{-1}$ outputs the scaling factor α which is a vector satisfying $f(\alpha)=\theta$.

6. The template matching apparatus according to claim 2, wherein when expanding or reducing at the scaling factor αi (αi>0 and 1<i<n) in which the lengths of respective dimensions of the n-dimensional template are different, the first limit value calculating unit or the second limit value calculating unit calculates the upper limit value and the lower limit value of the scaling factor α by a following expression (D);

$$f_3^{-1}(\theta) < \alpha < f_4^{-1}(\theta) \quad (D)$$

$$f_3(\alpha) = \frac{s}{\prod_{i=1}^{n} \frac{1}{\alpha_i}} + 1 - \prod_{i=1}^{n} \min\left(1, \frac{1}{\alpha_i}\right)$$

$$f_4(\alpha) = s + 1 - \prod_{i=1}^{n} \min\left(1, \frac{1}{\alpha_i}\right).$$

7. The template matching apparatus according to claim 2, wherein the first matching unit or the second matching unit divides the input signals into a plurality of regions and performs the search individually for the respective divided regions.

8. The template matching apparatus according to claim 2, wherein the first matching unit or the second matching unit calculates the similarity using a norm on the basis of an average brightness value.

9. A computer-implemented template matching method executed by a processor of a computer apparatus, the method comprising:
inputting an input signal;
(1) obtaining first similarities between the input signal and a template at different search positions on the input signal, the template being an initial template having a predetermined initial size or a scaled template obtained by expanding or reducing the initial template by a given scaling factor, (2) obtaining the first similarities on the basis of a distribution of an amount of characteristics of the template and a distribution of an amount of characteristics in a search window on the input signal at respective search positions, and (3) obtaining a highest first similarity from among the first similarities;
estimating an estimated highest similarity for the input signal when the template is expanded or reduced on the basis of the highest first similarity;
calculating an upper limit value and a lower limit value of the scaling factor of the template from the estimated highest similarity so that a highest similarity when the template is expanded or reduced does not exceed a threshold value;
scaling the template by the scaling factor within the scaling range determined by the upper limit value and the lower limit value;
(1) obtaining second similarities between the input signal and the scaled template while moving a search position on the input signal, (2) obtaining the second similarities on the basis of a distribution of the amount of characteristics on the scaled template and a distribution of the amount of characteristics in a search window on the input signal at respective search positions, and (3) obtaining a highest second similarity among the second similarities;
calculating a scaling range including an upper limit value of expansion or a lower limit value of reduction of the scaling factor of the template from the highest second similarity so that a highest similarity when the template is expanded or reduced does not exceed the threshold value;
changing the scaling factor when the scaling range including the upper limit value of expansion or the lower limit value of reduction of the scaling factor of the template and the scaling range whereby a size of the template used to obtain the first similarities is determined are not overlapped;
controlling the highest second similarity to be used in the estimating instead of the highest first similarity when the scaling range including the upper limit value of expansion or the lower limit value of reduction of the scaling factor of the template and the scaling range whereby the size of the template used to obtain the first similarities are overlapped; and
expanding or reducing the template until the size of the template reaches a given range and repeating the search on the basis of the expanded or reduced template.

10. A non-transitory computer-readable medium including a template matching program stored thereon, which when executed, causes a computer, to perform operations comprising:
inputting an input signal;
(1) obtaining first similarities between the input signal and a template at different search positions on the input signal, the template being an initial template having a predetermined initial size or a scaled template obtained by expanding or reducing the initial template by a given scaling factor, (2) obtaining the first similarities on the basis of a distribution of an amount of characteristics of the template and a distribution of an amount of characteristics in a search window on the input signal at respective search positions, and (3) obtaining a highest first similarity from among the first similarities;
estimating an estimated highest similarity for the input signal when the template is expanded or reduced on the basis of the highest first similarity;
calculating an upper limit value and a lower limit value of the scaling factor of the template from the estimated highest similarity so that a highest similarity when the template is expanded or reduced does not exceed a threshold value;
scaling the template by the scaling factor within the scaling range determined by the upper limit value and the lower limit value;
(1) obtaining second similarities between the input signal and the scaled template while moving a search position on the input signal, (2) obtaining the second similarities on the basis of a distribution of the amount of characteristics on the scaled template and a distribution of the amount of characteristics in a search window on the input signal at respective search positions, and (3) obtaining a highest second similarity among the second similarities;

calculating a scaling range including an upper limit value of expansion or a lower limit value of reduction of the scaling factor of the template from the highest second similarity so that a highest similarity when the template is expanded or reduced does not exceed the threshold value;

changing the scaling factor when the scaling range including the upper limit value of expansion or the lower limit value of reduction of the scaling factor of the template and the scaling range whereby a size of the template used to obtain the first similarities is determined are not overlapped;

controlling the highest second similarity to be used in the estimating instead of the highest first similarity when the scaling range including the upper limit value of expansion or the lower limit value of reduction of the scaling factor of the template and the scaling range whereby the size of the template used to obtain the first similarities are overlapped; and expanding or reducing the template until the size of the template reaches a given range and repeating the search on the basis of the expanded or reduced template.

* * * * *